(12) United States Patent
Rhoads

(10) Patent No.: US 9,544,516 B2
(45) Date of Patent: Jan. 10, 2017

(54) METHOD AND APPARATUS FOR SENSOR CHARACTERIZATION

(75) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 1787 days.

(21) Appl. No.: 12/643,386

(22) Filed: Dec. 21, 2009

(65) Prior Publication Data

US 2010/0165158 A1 Jul. 1, 2010

Related U.S. Application Data

(60) Provisional application No. 61/140,903, filed on Dec. 26, 2008.

(51) Int. Cl.
| | |
|---|---|
| *H04N 5/365* | (2011.01) |
| *H04N 1/00* | (2006.01) |
| *H04N 1/32* | (2006.01) |
| *H04N 1/401* | (2006.01) |

(52) U.S. Cl.
CPC .......... *H04N 5/365* (2013.01); *H04N 1/00002* (2013.01); *H04N 1/0005* (2013.01); *H04N 1/0009* (2013.01); *H04N 1/00013* (2013.01); *H04N 1/00031* (2013.01); *H04N 1/00047* (2013.01); *H04N 1/00063* (2013.01); *H04N 1/00068* (2013.01); *H04N 1/00076* (2013.01); *H04N 1/00087* (2013.01); *H04N 1/00307* (2013.01); *H04N 1/32149* (2013.01); *H04N 1/401* (2013.01)

(58) Field of Classification Search
CPC H04N 5/365; H04N 1/00002; H04N 1/00013; H04N 1/00031; H04N 1/00047; H04N 1/32149

USPC .............................................. 348/222.1, 294
See application file for complete search history.

(56) References Cited

U.S. PATENT DOCUMENTS

| | | | |
|---|---|---|---|
| 5,471,515 | A | 11/1995 | Fossum et al. |
| 6,122,403 | A | 9/2000 | Rhoads |
| 6,298,166 | B1 | 10/2001 | Ratnakar et al. |
| 6,396,045 | B1 | 5/2002 | Ballingall et al. |
| 6,404,926 | B1 | 6/2002 | Miyahara et al. |
| 6,483,927 | B2 | 11/2002 | Brunk et al. |

(Continued)

OTHER PUBLICATIONS

Limone, Dark Frame Subtraction using Adobe Photoshop, column from TakeGreatPictures dot com web site, Mar. 22, 2006.

*Primary Examiner* — Ahmed A Berhan
*Assistant Examiner* — Fayez Bhuiyan
(74) *Attorney, Agent, or Firm* — Digimarc Corporation

(57) ABSTRACT

The detailed technology relates to optical sensors, and more particularly relates to characterizing local behaviors of a sensor, and using such characterization information in a sensor-based system. In a particular arrangement, output signals produced from each of plural sensing elements in a 2D optical sensor are checked to determine whether they tend to differ from output signals produced by one or more neighboring sensing elements—when combined across plural captured image frames. The results are stored in an associated memory, and can be consulted in determining how image data captured from the sensor should be used. The technology is particularly illustrated in the context of a watermark decoder for a cell phone camera. A variety of other features and arrangements are also detailed.

10 Claims, 4 Drawing Sheets

(56) References Cited

U.S. PATENT DOCUMENTS

| | | |
|---|---|---|
| 6,535,617 B1 | 3/2003 | Hannigan et al. |
| 6,577,745 B1 | 6/2003 | Op De Beeck et al. |
| 6,580,809 B2 | 6/2003 | Stach et al. |
| 6,590,996 B1 | 7/2003 | Reed et al. |
| 6,608,930 B1 | 8/2003 | Agnihotri et al. |
| 6,631,198 B1 | 10/2003 | Reed |
| 6,654,479 B1 | 11/2003 | Liao et al. |
| 6,665,419 B1 | 12/2003 | Oami |
| 6,707,928 B2 | 3/2004 | Acharya et al. |
| 6,724,914 B2 | 4/2004 | Brundage et al. |
| 6,751,359 B1 | 6/2004 | Handley |
| 6,947,606 B2 * | 9/2005 | McLaughlin ................. 382/246 |
| 7,020,303 B2 | 3/2006 | Levy |
| 7,058,223 B2 | 6/2006 | Cox |
| 7,151,854 B2 | 12/2006 | Shen |
| 7,231,061 B2 | 6/2007 | Bradley |
| 7,283,163 B1 | 10/2007 | Noda |
| 7,548,655 B2 * | 6/2009 | Tatsumi et al. ............... 382/236 |
| 7,605,940 B2 * | 10/2009 | Silverbrook et al. ........ 358/1.17 |
| 7,668,334 B2 | 2/2010 | Reed et al. |
| 8,023,013 B1 | 9/2011 | Linzer et al. |
| 8,237,824 B1 | 8/2012 | Linzer |
| 2002/0191091 A1 | 12/2002 | Raynor |
| 2004/0027462 A1 | 2/2004 | Hing |
| 2004/0080644 A1 | 4/2004 | Suzuki et al. |
| 2005/0117035 A1 | 6/2005 | Hofflinger et al. |
| 2005/0140795 A1 | 6/2005 | Hisamatsu et al. |
| 2005/0157942 A1 | 7/2005 | Chen et al. |
| 2005/0248671 A1 * | 11/2005 | Schweng ..................... 348/246 |
| 2005/0259166 A1 | 11/2005 | Tsuda et al. |
| 2006/0031684 A1 | 2/2006 | Sharma et al. |
| 2006/0268143 A1 | 11/2006 | Boettiger et al. |
| 2006/0279632 A1 | 12/2006 | Anderson |
| 2007/0019085 A1 * | 1/2007 | Suzuki ......................... 348/241 |
| 2008/0036886 A1 * | 2/2008 | Hannigan et al. ............ 348/273 |
| 2008/0143855 A1 | 6/2008 | Hussey et al. |
| 2008/0143856 A1 * | 6/2008 | Pinto et al. ................... 348/246 |
| 2008/0143857 A1 * | 6/2008 | Shimizu et al. .............. 348/294 |
| 2009/0046180 A1 | 2/2009 | Shibano et al. |

* cited by examiner

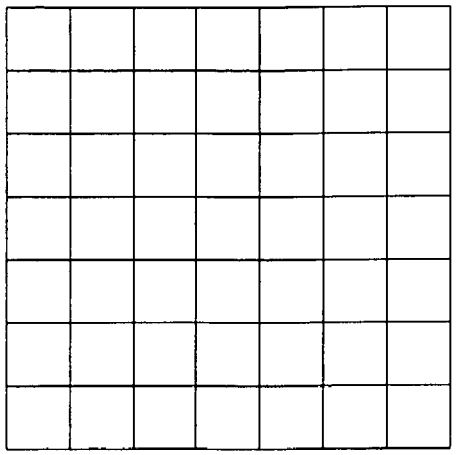
FIG. 1
FIG. 2
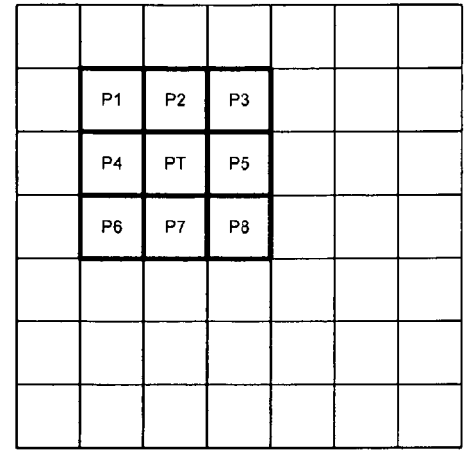
FIG. 3
FIG. 4
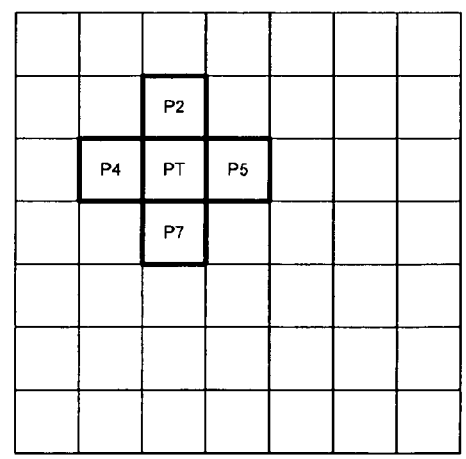

METHOD AND APPARATUS FOR SENSOR CHARACTERIZATION

RELATED APPLICATION DATA

This application claims priority to provisional application 61/140,903, filed Dec. 26, 2008.

FIELD OF THE TECHNOLOGY

The present technology relates to optical sensors, and more particularly relates to characterizing local behaviors of a sensor, and using such characterization information in a sensor-based system.

BACKGROUND AND SUMMARY

Optical sensors are in widespread use, including in cell phones, telescopes, medical imaging equipment, etc. CCD and CMOS sensors are currently the most popular varieties, although others are gaining in popularity.

For some applications, accuracy of the sensor data is of low importance; in others accuracy is critical. Discerning digital watermark data from captured imagery is one in which sensor accuracy matters.

As is familiar, digital watermark technology relies on subtle image variations to encode auxiliary information. These variations escape notice by human observers (i.e., they are steganographic), but they can be discerned by computer analysis. Because the variations may be on the order of 1% (e.g., in luminance), even small errors in sensor data acquisition can lead to challenges in decoding watermark data.

Such errors have been mitigated in the prior art by various techniques, including use of data redundancy and error-correcting encoding techniques. However, if sensor errors can be addressed, still better accuracy can be achieved.

Compensation for sensor imperfections is commonplace in other fields, such as astronomical imaging. When imaging the night sky, a sensor is first operated in total darkness (e.g., shielded from the viewing aperture) to identify baseline noise associated with each sensor pixel. The resulting "dark frame" of data is then subtracted from subsequent images to correct for this extraneous signal contributed by the sensor.

In accordance with one embodiment of the present technology, the baseline behavior of sensors is assessed. However, instead of characterizing the absolute behavior of a sensor cell, its behavior relative to one or more neighbors is determined.

In a particular embodiment, a set of plural reference images are collected. Over a large enough set, the probability that a pixel produces an output signal above that of its neighbors should match the probability that a pixel produces an output signal below its neighbors.

For example, in an ideal sensor array in which each cell outputs a digital value between 0 and 255, each pixel may produce an output below its neighbors 35% of the time, and produce an output above its neighbors 35% of the time (with the pixel producing an output equal to its neighbors the remaining 30% of the time). With other sets of reference images the numbers may be different, but the above/below likelihoods should be equal.

Once the relative biases of different pixels are determined—whether to individual neighbors, or neighbors as a group—this data can be used in various ways. For example, compensations can be applied to correct these variations. Or subsequent image processing operations can simply ignore signals from pixels whose biases exceed a threshold value.

In testing the image sensor of one cell phone camera, it was found that about 38% of the pixels showed a strong bias relative to a neighbor. In particular, each of those pixels, on average, produced an output above (or below) their neighbors 60% of the time. So instead of 35%-30%-35% as in the earlier example, these pixels demonstrated behaviors of 60%-X-Y (or Y-X-60%). By simply ignoring these outlier pixels (or pixel pairs) in watermark decoding, substantially improved results can be achieved.

The foregoing and other features and advantages of the present technology will be more readily apparent from the following detailed description, which proceeds with reference to the accompanying drawings.

BRIEF DESCRIPTION OF THE DRAWINGS

FIG. 1 shows an array of sensor cells.

FIG. 2 shows one neighborhood (of eight sensor cells) for a target cell (CT).

FIG. 3 shows another neighborhood (of 24 sensor cells) for a target cell.

FIG. 4 shows another neighborhood (of four sensor cells) for a target cell.

DETAILED DESCRIPTION

In an ideal image sensor, each sensing element (pixel) gives the same output signal when stimulated with the same amount of incident light.

In actual practice, the output signals vary. This can be caused by numerous factors, including slight differences in the physical sizes of the photosensors, manufacturing tolerances in the analog-to-digital converter circuitry, variations in semiconductor doping, etc., etc.

To sense these variations, an image sensor (e.g., in a cell phone camera) is used to capture plural images. This can be done by capturing several seconds (or a minute) of video, while moving the camera to point at different subjects. Or the camera can be pointed at a generally featureless subject, such as a wall or the sky, and moved around. The captured images may be in focus, but need not be. (Out of focus may be preferred, since high frequency spatial image variations are attenuated or lost.) If the camera captures ten or thirty image frames a second in video mode, several hundred frames of data can quickly be acquired.

In other arrangements, multiple still-image frames can be captured. Or, instead of moving the camera, the subject may be moved, or a lens may be moved to vary the position of the subject on the sensors. (One suitable subject is a printed poster of pseudo-random noise.)

Within any single frame of captured image data, pixel-to-pixel variations in output signals are expected (reflecting features in the imaged subject). However, if a sufficiently large number of different frames are captured, then the average value of the output signals produced by one pixel should equal the average value of the output signals produced by each other pixel in the sensor. In actual practice, this latter equality rarely holds.

In accordance with one embodiment of the technology, the captured data is analyzed to determine whether output signals from one pixel (a target pixel) tend to differ from output signals produced by one or more other pixels (which may be drawn from a neighborhood near the target pixel). This analysis is typically conducted for each pixel in the sensor array.

FIG. 1 shows an array of sensing elements in a CMOS or CCD 2D image sensor. An exemplary sensor of the sort commonly found in many cell phones may comprise 640 rows of pixels and 480 columns of pixels. FIGS. 2-7 show different neighborhoods of pixels around a target pixel PT. In a limiting case, the neighborhood can comprise all of the other sensing elements in the array.

Figure 5:
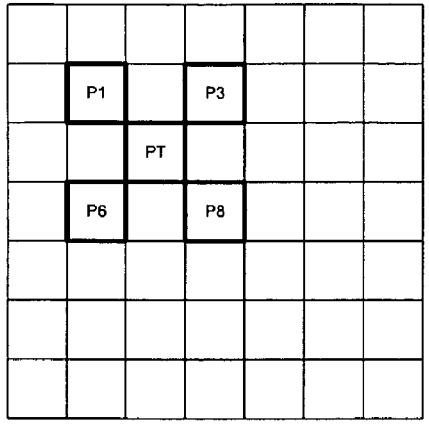
FIG. 5 shows another neighborhood (of four sensor cells) for a target cell.
Figure 6:
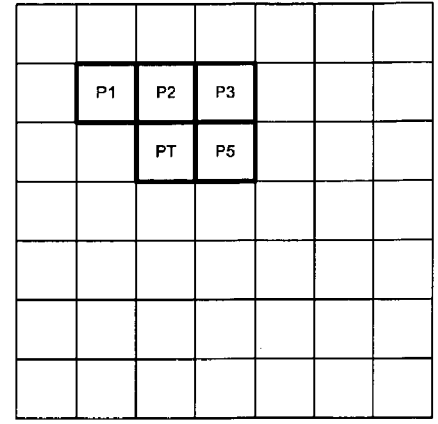
FIG. 6 shows another neighborhood (of four sensor cells) for a target cell.
Figure 7:
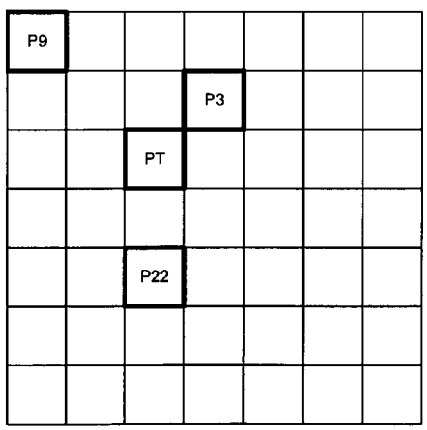
FIG. 7 shows another neighborhood (of three sensor cells) for a target cell.

Referring to FIG. 6, a particular implementation captures 100 reference images. The average value output signal from each of pixels P1, P2, P3, and P5 is computed across these 100 frames. Those individual pixel averages can themselves be averaged to yield a neighborhood average. The neighborhood average is then compared with the average value output signal from target pixel PT across these same 100 reference images.

This analysis may show that the target pixel PT produces an output signal—on average—that is only 90% the average output signal from the neighborhood of pixels. Its average output thus "deceeds" the neighborhood average by 10%. ("Deceed" is used here as the opposite of "exceed.")

The apparatus in which the sensor is used (e.g., a cell phone camera, operating in a mode that decodes steganographically encoded digital watermark signals from captured imagery) may have a parameter stored in memory (or hard-wired) that establishes a threshold beyond which a pixel's output is regarded as unsuitable. The threshold may be, for example, 8%. If a target pixel produces average output signals that exceed or deceed the average output signals from a neighborhood of pixels by more than the threshold value, the output of that target pixel may be disregarded in decoding the watermark.

The results of this analysis are stored in a memory. A data structure having dimensions equal to that of the sensor can be used (e.g., 640×480 locations). If a pixel is disqualified because its average output signal exceeds or deceeds the neighborhood average, a "0" can be written to the corresponding location in the memory. If the pixel's average output signal is within the allowable threshold, then a "1" can be stored.

When performing watermark decoding, an apparatus can consult the memory to determine which pixels should be ignored. Such ignoring of pixel data is generally not critical, because a digital watermark is typically encoded in a highly redundant fashion. In fact, ignoring such errant data can significantly speed the watermark detection process, since numerous mathematical manipulations involved in the decoding operation are simply not performed for the disqualified pixels. (For example, branching in the watermark decoder software can divert the process to no-op (NOP) instructions instead of the usual mathematical manipulations, when image data from a disqualified pixel is being processed.)

Figure 8:
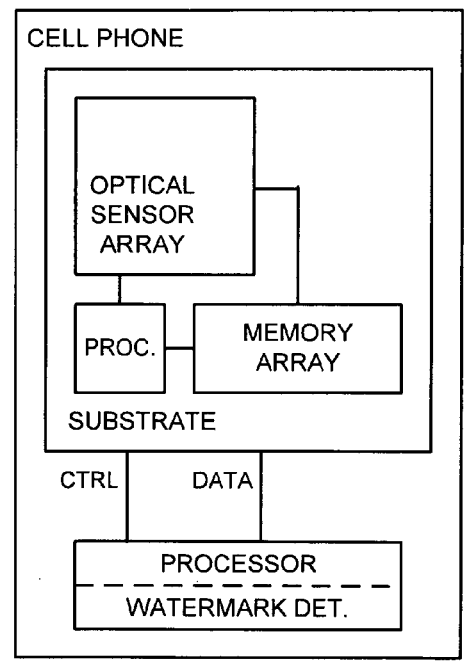
FIG. 8 shows an apparatus according to one embodiment.

FIG. 8 shows a cell phone employing the just-described technology. In this arrangement, the photoelectric sensor elements, the memory, and a dedicated processor are all integrated onto a common substrate. The integrated processor can perform the described analysis, or another processor—in the phone or elsewhere (e.g., at a sensor manufacturing facility)—can do these calculations. The memory identifying disqualified pixels can be the on-substrate memory, or another memory can be used. The watermark decoder is typically off-chip (and may be implemented using software that executes on the cell phone's primary processor). For clarity of illustration, other elements comprising the cell phone (e.g., display, keypad, wireless transceiver, etc.) are not shown, but are familiar to the artisan.

(Watermark-related technology and applications are also familiar to the artisan. Examples are detailed in the assignee's U.S. Pat. Nos. 6,483,927, 6,580,809, 6,590,996, 6,631,198, 6,724,914, 6,947,571, and 7,231,061. The complete disclosures of these patents are incorporated by reference, as if fully set forth herein.)

Figure 9:
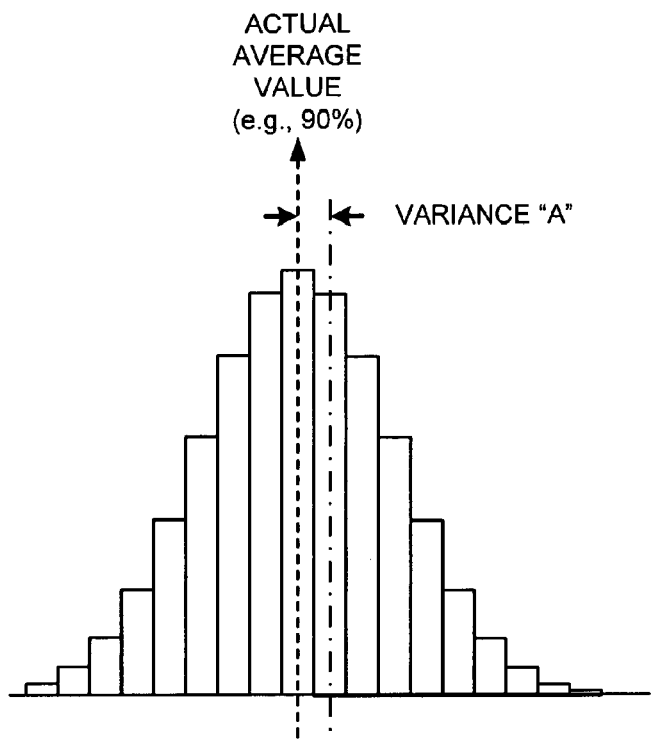
FIG. 9 is a histogram showing a comparison of a target sensor cell output value with a neighborhood average of output values, across plural captured reference images.

FIG. 9 is a histogram showing the target pixel output signal as a percentage of the neighborhood average output signal, for 100 captured images. Sometimes—due to image characteristics—the target pixel output signal far exceeds the neighborhood average. Sometimes the target pixel output signal far deceeds the average. But overall, the expected average value should be 100%. As shown in FIG. 9, the actual average value for the exemplary target pixel is 90%. Thus "Variance A" is 10%.

Figure 10A:
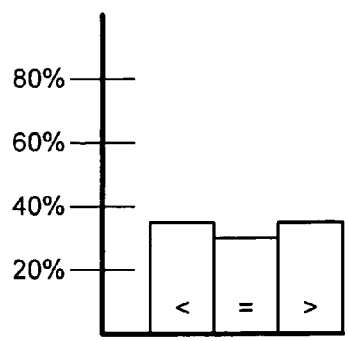
FIGS. 10A and 10B are histograms showing the frequency by which the output value from a target cell is less than, is equal to, and is greater than, a neighborhood average of output values, across plural captured reference images.
Figure 10B:
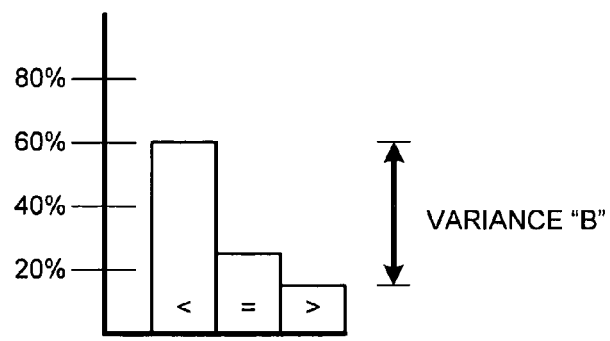

FIGS. 10A and 10B show a different way of analyzing the data. Instead of depicting the average values produced by the target pixel and the associated neighborhood, these three-element histograms show the frequency of occurrence that the target pixel produces an output signal that (1) deceeds, (2) equals, or (3) exceeds the average of the associated neighborhood. FIG. 10A shows results that may be achieved in a perfect sensor: the deceed occurrences perfectly match the exceed occurrences.

FIG. 10B shows results of an actual pixel. For 60% of the captured reference frames the output from the target pixel deceeds the neighborhood average. For 25% it equals the neighborhood average, and for only 15% does it exceed the neighborhood average. By this metric, the "Variance B" is 45%.

In different applications, different metrics (e.g., Variance A or Variance B, or some other metric) may be used to determine whether a pixel should be disqualified. It will be recognized that in some instances, Variance A can be small, or even zero, while Variance B for the same pixel can be large. (For example, 80% of the time the neighborhood average signal can be 95% of the target pixel signal, and 20% of the time it can be 120% of the neighborhood average signal. This nets out to have the target pixel average signal equal the average neighborhood value, i.e., Variance A=0%. But the Variance B metric in this case is 40%.) The opposite circumstance can also arise.

In a particular cell phone embodiment, the Variance B metric is employed. Target pixels for which the Variance B metric is greater than 20% are disqualified from use in watermark decoding.

Other metrics can also be used. For example, in FIG. 10B, the amount by which the larger of the exceed/deceed percentages surpasses 50% can be a measure. If this value is positive, or if it exceeds a threshold such as 5% or 10%, that target pixel may be disqualified.

A great number of variations on the foregoing are of course possible.

For example, instead of storing only a single bit of data in the memory for each pixel (e.g., "0" if disqualified, else "1"), the computed Variance value for that pixel may be stored. In later processing, the Variance for each pixel can be recalled and tested against a threshold to determine what use—if any—to make of that pixel's output signal.

In another variation, instead of taking the averages of the individual neighboring pixels, and computing a neighborhood average to compare against the target pixel average, other comparisons can be used. For example, a difference can be calculated between a neighboring pixel and the target pixel for each of the captured reference images, and this operation repeated for each of the neighboring pixels. These differences can then be averaged. Or their geometric mean can be computed. The distance between the neighboring pixel and the target pixel can be computed, and factored into the calculation, so that closer neighbors are weighted more than remote neighbors.

If the average difference between an individual neighbor pixel and the target pixel is computed across all of the reference images, this same result—with a change in sign—can later be used when that neighbor pixel is being analyzed as the target pixel. So an economy in processing can be achieved.

To illustrate, again consider FIG. 6. While each target pixel has eight immediate neighbors, difference calculations involving only four may be performed when each target pixel is analyzed. The other four are picked up later (or earlier) when the target pixel serves as a neighbor to one of those four pixels. So while the pixel immediately below pixel PT is not labeled as one of its four neighbors, at another point in the analysis the one immediately below will be the target pixel, and what is now depicted as PT will become its neighbor P2. Thus, difference data for all eight neighbors are eventually gathered; each datum is used twice.

Figure 11:
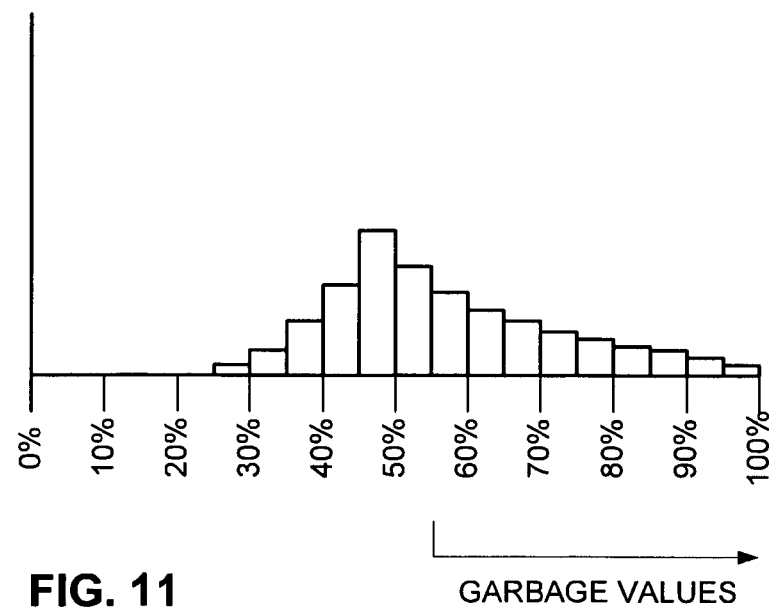
FIG. 11 is a histogram showing dominant polarity occurrences.

FIG. 11 shows another way the data can be analyzed. The output signal from each target pixel is compared with the output signal from one of four neighboring pixels, for each of the plural (e.g., 200) reference images. For each paired-pixel comparison, one of the "deceeds" or "exceeds" occurrences will dominate across these 200 examples (the "dominant polarity")—typically appearing in between 30%-100% of the 200 cases. (30% would occur, e.g., when the "equals" state occurs 45% of the time, the "deceeds" state occurs 30% of the time, and the "exceeds" state occurs 25% of the time.) Each target pixel contributes four values to the histogram (one expressing relationship to each of four neighbors), and there are 307,200 such target pixels in the array, yielding a total of 1,228,000 data points. In FIG. 11, these are grouped in bins of 5% each.

The paired-pixel data represented in FIG. 11 can serve as another characterization metric. Those data points for which the dominant polarity exceeds, e.g., 55% may be regarded as garbage data. Relationships between those pixel pairs may be disregarded in subsequent image processing (e.g., in decoding watermark data).

In an implementation according to the just-described arrangement, the memory can have 1,228,000 data stored—one for each of the four pixel pairs associated with each target pixel. Again, each storage location in the data structure can store a "0" or "1" indicating bad/good, or an actual numeric datum can be stored (e.g., that the target pixel exhibits a dominant polarity over the paired neighbor pixel 57% of the time, or that it exhibits an average output signal that is 93% of the neighbor's output signal, etc.).

In conducting the foregoing analyses, it will be recognized that edge cases arise, in which the neighborhood for a pixel extends beyond the physical extent of the sensor. These cases can be handled by choosing different neighborhoods, or otherwise.

The sensor characterization process may be performed by the sensor manufacturer or vendor, and corresponding data can be stored in an associated memory that is provided with the sensor. (Non-volatile flash or ROM memory can be used.) Or the characterization can occur as a one-time process when the sensor is first deployed in a cell phone. Or the characterization can occur as a background process during the cell phone's regular operation—using images captured by the user during normal phone operation as reference images.

Applications extend far beyond cell phones; that example was used simply for expository convenience. Any apparatus employing a multiple element image sensor—including 1D sensors such as in flatbed scanners—can use the technology.

The preferred embodiment analyzes the pixel outputs after they have been converted into digital values (e.g., 8-bits) by on-chip analog-to-digital converters. However, in other embodiments the analysis can be performed on the analog signals originally produced by the sensor cells.

In certain watermark decoding processes detailed in the cited patents, a median filtering operation is applied to captured image data before decoding. For example, output signals from eight pixels surrounding a subject pixel are averaged, and this value is subtracted from the output signal of that subject pixel. This operation tends to reduce the low frequency, global variations due to the imaged subject—leaving the higher frequency, local variations associated with the encoded watermark. (It will be recognized that signals due to the imaged subject act as unwanted noise—tending to obliterate the desired watermark signal.)

In performing this median filtering operation, surrounding pixels that are indicated by stored data in the memory as disqualified (i.e., because their measured Variance as a target pixel exceeds the applicable threshold) are disregarded in computing the average to the subtracted from the subject pixel value. In some embodiments, if more than N (e.g., one, two, three, four, five or six) of the surrounding pixels are disqualified, then only the N pixels with the highest variances are disqualified, and the others are used to compute an average value.

If individual paired-pixel data is collected, as in FIG. 11, those pairings where the dominant polarity exceeds the applicable threshold (e.g., 55%) can be disregarded if one of the pair is a target pixel and one is among the eight immediate neighbors.

In some embodiments, all pixels—even those with large Variances—are subjected to the median filtering operation, and the resulting array of filtered image data is provided to the watermark detector. (That is, results of the pixel characterization process only prevent surrounding pixels from contributing to the to-be-subtracted average value; the subject pixel is used regardless of its Variance—whether to the average of its neighbors, or in paired relationship to individual neighbors.)

Rather than using the stored information to disqualify pixels from influencing certain operations, the stored information can be used to compensate the output signals from these pixels. For example, if one of the foregoing characterization procedures indicates that a particular pixel tends to produce an output signal 9% less than its neighbors, then the output signal can be increased correspondingly prior to its use. The gain of the digital-to-analog converter can be controlled by a signal derived from the memory data. Alternatively, compensation can be applied after the pixel signal is in digital form.

Alternatively, all of the pixels can be used, with their uncorrected output signals. However, the influence given to each pixel in a final output determination may be weighted differently—depending on its variance. For example, in a watermark decoding process detailed in the cited patents, each pixel effectively casts a vote that a bit of the encoded watermark payload is either a "1" or a "0." If the Variance A or Variance B for that pixel is 0%, it may be accorded a full vote. As its Variance increases, the pixel's weighted vote decreases. (A possible weighting factor K for a Variance V is $K=(1-V)^2$, so a 10% variance yields a weighting factor of 0.81.)

It will be recognized that implementations detailed above characterize pixels not in absolute terms, but in terms of relationship to neighbors (preferably nearby neighbors). So if a sensor has a region that exhibits diminished global sensitivity (e.g., pixels in the "southeast" quadrant produce output signals weaker than in other regions), this fact is not typically evident in the collected characterization data (except, perhaps, at the quadrant boundary—if the transition is abrupt). Such large, global variations in sensitivity are generally of no consequence in watermark detection, due to watermark reliance on small, local signal variations. (This is in contrast to prior art techniques, where pixel sensitivity is assessed wholly in an absolute sense.)

The pixels' relative sensitivities may vary as a function of light level. Thus, in an alternative arrangement, a sensor may be characterized at plural different light levels, with associated characterization data stored for each. For example, a sensor may be illuminated dimly (e.g., producing output signals in the range of 0-85), brightly (170-255), and at intermediate brightnesses (e.g., 86-169), and three respective sets of sensor characterization data can then be stored. In use, different of the data can be utilized, depending on which of the three illumination conditions prevails in a different areas of the sensor.

Likewise, the pixels' relative sensitivities may vary as a function of color. Again, different sets of characterization data can be collected (e.g., for red, green and blue illumination), and utilized for compensation.

Looking ahead, sensors are expected to evolve, in design, to more closely parallel the model of a biological eye, e.g., with local support for some elemental image processing operations (such as distinguishing edges, discerning motion, etc.). Hardware that supports some such additional processing operations is likely to be integrated on the same substrate as the sensor. Thus, for example, a chip may output hardware-detected edge information, or other processed image data, in addition to simply pixel values.

Just as innate pixel output signals vary from pixel to pixel, such future sensors may show biases in other forms of output. These may be spatially localized (as with pixel output values). They may additionally, or alternatively, have a temporal component (e.g., parts of the sensor may be more sluggish in responding to light-to-dark transitions that other parts of the sensor).

The principles detailed earlier can likewise be applied to characterize such other biases in sensor output. That is, a sensor system can be exposed to a large collection of relevant stimuli, and the behavior of the sensor system can then be analyzed to discern variations in response from a norm. Once characterized, appropriate equalization can be applied so as to compensate for such anomalies.

Having described and illustrated principles of the technology with reference to various examples, it will be recognized that the technology can be further modified in arrangement and detail. Accordingly, I claim as my invention all such modifications as come within the scope of the following claims.

I claim:

1. A method employing an image sensor that is manufactured by a producer, and subsequently incorporated into an end-product employed by a user, the image sensor comprising plural pixels that each produces a pixel value corresponding to an intensity of incident illumination, in which the pixels should produce identical pixel values given identical incident illumination, the method comprising the acts:

processing plural image frames captured by the sensor, when used in said end-product by the user, to dynamically characterize the sensor performance as a background operation, said processing including:

identifying a first neighborhood grouping of sensor pixels, the first neighborhood grouping consisting of a first target pixel and a first set of one or more comparison pixels, the first neighborhood grouping being a subset of the sensor pixels, wherein certain sensor pixels are not included within the first neighborhood grouping;

comparing an average pixel value of the first target pixel, computed across said plural frames, with an average pixel value of the first set of comparison pixels, computed across said plural frames to determine whether the first target pixel produces output signals that are larger, on average, than output signals from the first set of comparison pixels;

identifying a second neighborhood grouping of sensor pixels, the second neighborhood grouping consisting of a second target pixel and a second set of one or more comparison pixels, the second neighborhood grouping being a subset of the sensor pixels, wherein certain sensor pixels are not included within the second neighborhood grouping;

comparing an average pixel value of the second target pixel, computed across said plural frames, with an average pixel value of the second set of comparison pixels, computed across said plural frames to determine whether the second target pixel produces output signals that are larger, on average, than output signals from the second set of comparison pixels;

the second set of comparison pixels being different than the first set of comparison pixels;

storing error data for at least one of the first and second target pixels, based on results of said comparing acts;

decoding a steganographically-encoded digital watermark signal from a further frame of captured imagery, said decoding employing the stored error data;

wherein the method adapts through use of the end-product, discerning that at least one of said target pixels that outputs pixel values actually outputs biased pixel values, and employs the stored error data to achieve improved watermark decoding results.

2. The method of claim 1 that further includes compensating at least one value in the further frame of imagery prior to decoding of the digital watermark signal, based on the stored error data.

3. The method of claim 1 in which said decoding act comprises decoding said digital watermark signal from the further frame of imagery, wherein the decoding includes disregarding pixel data from at least one of the first and second target pixels, based on the stored error data.

4. The method of claim 1 in which the decoding act includes weighting votes cast by one or more of said sensor pixels in accordance with the stored error data.

5. The method of claim 1 in which:
the stored error data comprises first data indicating that the first target pixel outputs pixel values larger, on average, than the average pixel values of the first neighborhood; and
the stored error data comprises second data indicating that the second target pixel outputs pixel values smaller, on average, than the average pixel values of the second neighborhood.

6. The method of claim 1 in which the end-product is a smartphone, and the processing is performed by a processor in the smartphone.

7. The method of claim 1 in which the sensor includes N rows by M columns of pixels, and the method includes determining whether the pixel value for each of the N*M pixels of said sensor is (a) larger or (b) smaller, on average across the plural captured frames of image data, than an average pixel value from a corresponding set of one or more comparison pixels, wherein there is a different set of comparison pixels respectively corresponding to each of the N*M pixels.

8. The method of claim 1 in which said processing plural image frames captured by the sensor comprises processing at least 100 image frames captured by the sensor.

9. A smartphone comprising an image sensor, a processor and a memory, the image sensor comprising plural pixels that each produces a pixel value corresponding to an intensity of incident illumination, in which the pixels should produce identical pixel values given identical incident illumination, the memory containing instructions configuring the processor to perform the following acts:
processing plural image frames captured by the sensor to dynamically characterize the sensor performance, as a background operation during the smartphone's normal operation, said processing including:
identifying a first neighborhood grouping of sensor pixels, the first neighborhood grouping consisting of a first target pixel and a first set of one or more comparison pixels, the first neighborhood grouping being a subset of the sensor pixels, wherein certain sensor pixels are not included within the first neighborhood grouping;
comparing an average pixel value of the first target pixel, computed across said plural frames, with an average pixel value of the first set of comparison pixels, computed across said plural frames to determine whether the first target pixel produces output signals that are larger, on average, than output signals from the first set of comparison pixels;
identifying a second neighborhood grouping of sensor pixels, the second neighborhood grouping consisting of a second target pixel and a second set of one or more comparison pixels, the second neighborhood grouping being a subset of the sensor pixels, wherein certain sensor pixels are not included within the second neighborhood grouping;
comparing an average pixel value of the second target pixel, computed across said plural frames, with an average pixel value of the second set of comparison pixels, computed across said plural frames to determine whether the second target pixel produces output signals that are larger, on average, than output signals from the second set of comparison pixels;
the second set of comparison pixels being different than the first set of comparison pixels;
storing error data for at least one of the first and second target pixels, based on results of said comparing acts;
decoding a steganographically-encoded digital watermark signal from a further frame of captured imagery, employing the stored error data to achieve improved watermark decoding results;
wherein the smartphone adapts through use, discerning that at least one of said target pixels that outputs pixel values actually outputs biased pixel values, and employs the stored error data to achieve improved watermark decoding results.

10. A non-transitory computer readable medium containing software instructions operative to configure a device programmed thereby to perform the following operations:
processing plural image frames captured by a sensor in the device to dynamically characterize the sensor performance, as a background operation during the device's normal operation, the sensor comprising plural pixels that each produces a pixel value corresponding to an intensity of illumination, wherein the pixels should all produce identical pixel values given identical incident illumination, said processing including:
identifying a first neighborhood grouping of sensor pixels, the first neighborhood grouping consisting of a first target pixel and a first set of one or more comparison pixels, the first neighborhood grouping being a subset of the sensor pixels, wherein certain sensor pixels are not included within the first neighborhood grouping;
comparing an average pixel value of the first target pixel, computed across said plural frames, with an average pixel value of the first set of comparison pixels, computed across said plural frames to determine whether the first target pixel produces output signals that are larger, on average, than output signals from the first set of comparison pixels;
identifying a second neighborhood grouping of sensor pixels, the second neighborhood grouping consisting of a second target pixel and a second set of one or more comparison pixels, the second neighborhood grouping being a subset of the sensor pixels, wherein certain sensor pixels are not included within the second neighborhood grouping;
comparing an average pixel value of the second target pixel, computed across said plural frames, with an average pixel value of the second set of comparison pixels, computed across said plural frames to determine whether the second target pixel produces output signals that are larger, on average, than output signals from the second set of comparison pixels;
the second set of comparison pixels being different than the first set of comparison pixels;
storing error data for at least one of the first and second target pixels, based on results of said comparing acts;
decoding a steganographically-encoded digital watermark signal from a further frame of captured imagery, said decoding employing the stored error data;
wherein the software instructions cause the device to adapt through use, discerning that at least one of said target pixels that outputs pixel values actually outputs biased pixel values, and employs the stored error data to achieve improved watermark decoding results.

* * * * *